United States Patent
Shimada et al.

[11] Patent Number: 6,156,215
[45] Date of Patent: Dec. 5, 2000

[54] METHOD OF FORMING A PROJECTION HAVING A MICRO-APERTURE, PROJECTION FORMED THEREBY, PROBE HAVING SUCH A PROJECTION AND INFORMATION PROCESSOR COMPRISING SUCH A PROBE

[75] Inventors: Yasuhiro Shimada, Hadano; Takeo Yamazaki, Yokohama, both of Japan

[73] Assignee: Canon Kabushiki Kaisha, Tokyo, Japan

[21] Appl. No.: 09/138,399

[22] Filed: Aug. 24, 1998

[30] Foreign Application Priority Data

Aug. 26, 1997 [JP] Japan .................................. 9-244803

[51] Int. Cl.⁷ ........................................................ B81C 3/00
[52] U.S. Cl. .............................. 216/11; 427/251; 427/309
[58] Field of Search .................................. 216/2, 11, 24, 216/27, 36, 39, 56; 427/123, 245, 251, 307, 309; 429/145, 146; 369/126; 250/234, 306; 73/105

[56] References Cited

U.S. PATENT DOCUMENTS

| | | |
|---|---|---|
| 5,294,790 | 3/1994 | Otah et al. ................................ 250/216 |
| 5,517,280 | 5/1996 | Quate ........................................ 355/71 |
| 5,574,279 | 11/1996 | Ikeda et al. ............................... 250/306 |
| 5,633,455 | 5/1997 | Quate ........................................ 73/105 |
| 5,866,021 | 2/1999 | Yagi et al. ................................. 216/84 |
| 5,883,387 | 3/1999 | Matsuyama et al. .................... 250/306 |
| 5,923,033 | 7/1999 | Takayama et al. ...................... 250/234 |
| 5,923,637 | 7/1999 | Shimada et al. ......................... 369/126 |
| 5,969,345 | 10/1999 | Williams et al. ........................ 250/234 |
| 6,011,261 | 1/2000 | Ikeda et al. ............................... 250/306 |
| 6,046,972 | 4/2000 | Kuroda et al. ........................... 369/126 |

FOREIGN PATENT DOCUMENTS

| | | |
|---|---|---|
| 0112402A1 | 7/1984 | European Pat. Off. . |
| 2-098849 | 4/1990 | Japan . |
| 4-090152 | 3/1992 | Japan . |

OTHER PUBLICATIONS

U. Dürig, et al., "Near–field Optical–scanning Microscopy", Journal of Applied Physics, 1986, vol. 59, pp. 3318–3327.
G. Binning, et al., "Surface Studies by Scanning Tunneling Microscopy", Physical Review Letters, 1982, vol. 49, pp. 57–61.
R.C. Reddick, et al., "New Form of Scanning Optical Microscopy", Physical Review B, 1989, pp. 767–770.

*Primary Examiner*—Frankie L. Stinson
*Assistant Examiner*—Allan Olsen
*Attorney, Agent, or Firm*—Fitzpatrick, Cella, Harper & Scinto

[57] ABSTRACT

A projection having a micro-aperture is formed by formiNg a dent having a pointed front end on a substrate, then depositing a light blocking material on the substrate except the front end of the dent, and peeling off the light blocking material from the substrate. The projection is suited as an optical probe of scanning near-field optical microscope (SNOM) for detecting or emitting light through the micro-aperture. For this purpose, the projection is formed on the end of a cantilever or on the end of an optical fiber. The dent having a pointed front end can be formed typically by patterned crystal-axis-anisotropic etching of a silicon substrate and subsequent thermal oxidation of the silicon surface.

7 Claims, 9 Drawing Sheets

LIGHT

METHOD OF FORMING A PROJECTION HAVING A MICRO-APERTURE, PROJECTION FORMED THEREBY, PROBE HAVING SUCH A PROJECTION AND INFORMATION PROCESSOR COMPRISING SUCH A PROBE

BACKGROUND OF THE INVENTION

1. Field of the Invention

This invention relates to a method of forming a projection having a micro-aperture. It also relates to a projection having a micro-aperture and prepared by such a method, to a probe or a multi-probe having such a projection or projections. More particularly, the present invention relates to a method of manufacturing a projection having a micro-aperture for detecting or irradiating evanescent light to be used for a near-field optical microscope and to a probe having such a projection. It also relates to an information processor utilizing such a probe.

2. Related Background Art

The invention of the scanning tunneling microscope (hereinafter referred to as STM) made it possible to visually observe the electron structure of surface atoms of an electric conductor (G. Binnig et al., Phys. Rev. Lett. 49, 57 (1982)) and hence a real space image of a specimen to be dimensionally measured with an enhanced degree of resolution regardless if the specimen is monocrystalline or noncrystalline. Since then, research efforts have been paid on the scanning probe microscope (hereinafter referred to as SPM) particularly in an attempt to look into the micro-structures of various materials.

SPMs include scanning tunneling microscopes (STMs), atomic force microscopes (AFMs) and magnetic force microscope (MFMs) that are adapted to detect the surface structure of a specimen by means of a tunneling current, an atomic force, a magnetic force or a beam of light produced when a probe having a micro-tip is brought very close to the specimen.

The scanning near-field optical microscope (hereinafter referred to as SNOM) has been developed from the STM. It can be used to examine the surface of a specimen by detecting evanescent light seeping out from the micro-aperture arranged at the sharp tip of the probe of the microscope by means of an optical probe from the surface of the speciman (Durig et al., J. Appl. Phys. 59, 3318 (1986)].

The photon STM (hereinafter referred to as PSTM) is a type of SNOM and adapted to examine the surface of a specimen by introducing a beam of light into the specimen from the backside through a prism, making the beam totally reflected by the surface of the specimen, and then detecting evanescent light seeping out from the surface of the specimen by means of an optical probe [Reddick et al., Phys. Rev. B39, 767 (1989)].

Since the resolution of an SNOM is determined as a function of the tip diameter of the optical probe, the surface of the probe is shielded against light and is typically provided with a micro-aperture at the tip thereof in an SNOM so that light may come out only through the small exit.

A number of techniques have been proposed to produce a micro-aperture. According to a proposed technique, a micro-aperture is formed by coating the intersection of cleaved planes of a transparent crystal with metal and then removing the metal from the intersection by pressing the metal-coated intersection against a very hard surface (see FIG. 10A) (European Patent EP0112402). According to another proposed technique, a micro-aperture is formed by depositing metal on the micro-tip by evaporation only from a given direction, while rotating the optical fiber probe, to produce an area carrying no metal deposit on it (see FIG. 10B).

However, only a single probe is formed at a time with any of the above listed known techniques. The process of forming a micro-aperture in such a way will inevitably show a poor productivity and it is difficult with any of the known techniques to realize a process that can produce a number of micro-apertures in an integrated manner.

Additionally, the known techniques are accompanied by the difficulty of precisely controlling the diameter of the micro-aperture to ensure a reliable degree of reproducibility.

SUMMARY OF THE INVENTION

In view of the above identified technological problems, it is therefore an object of the present invention to provide a method of forming a projection or projections having a micro-aperture, usually integrated on a substrate, with an enhanced degree of reproducibility, the method minimizing the variances in the diameter of the micro-apertures and achieving a high productivity through the batch-process operation. Another object of the present invention is to provide a projection having such a micro-aperture. Still another object of the present invention is to provide a probe having such a projection. Still another object of the invention is to provide an information processor using such a probe.

According to a first aspect of the invention, the above first object is achieved by providing a method of forming a projection having a micro-aperture comprising steps of:

forming a dent having a pointed front end on a substrate;

depositing a light blocking material on the substrate except the front end of the dent; and peeling off the light blocking material from the substrate.

According to other aspects of the invention, the remaining objects of the invention are achieved by providing a projection having a micro-aperture formed by the above described method, a probe or an optical fiber having such a projection and an information processor comprising such a probe.

The present invention will be described in greater detail hereinafter by way of examples.

DESCRIPTION OF THE PREFERRED EMBODIMENTS

A projection having a micro-aperture according to the invention is specifically designed to detect or irradiate evanescent light.

Now, a method of forming a projection having a micro-aperture according to the invention will be described by referring to FIGS. 1A through 1F.

Figure 9:
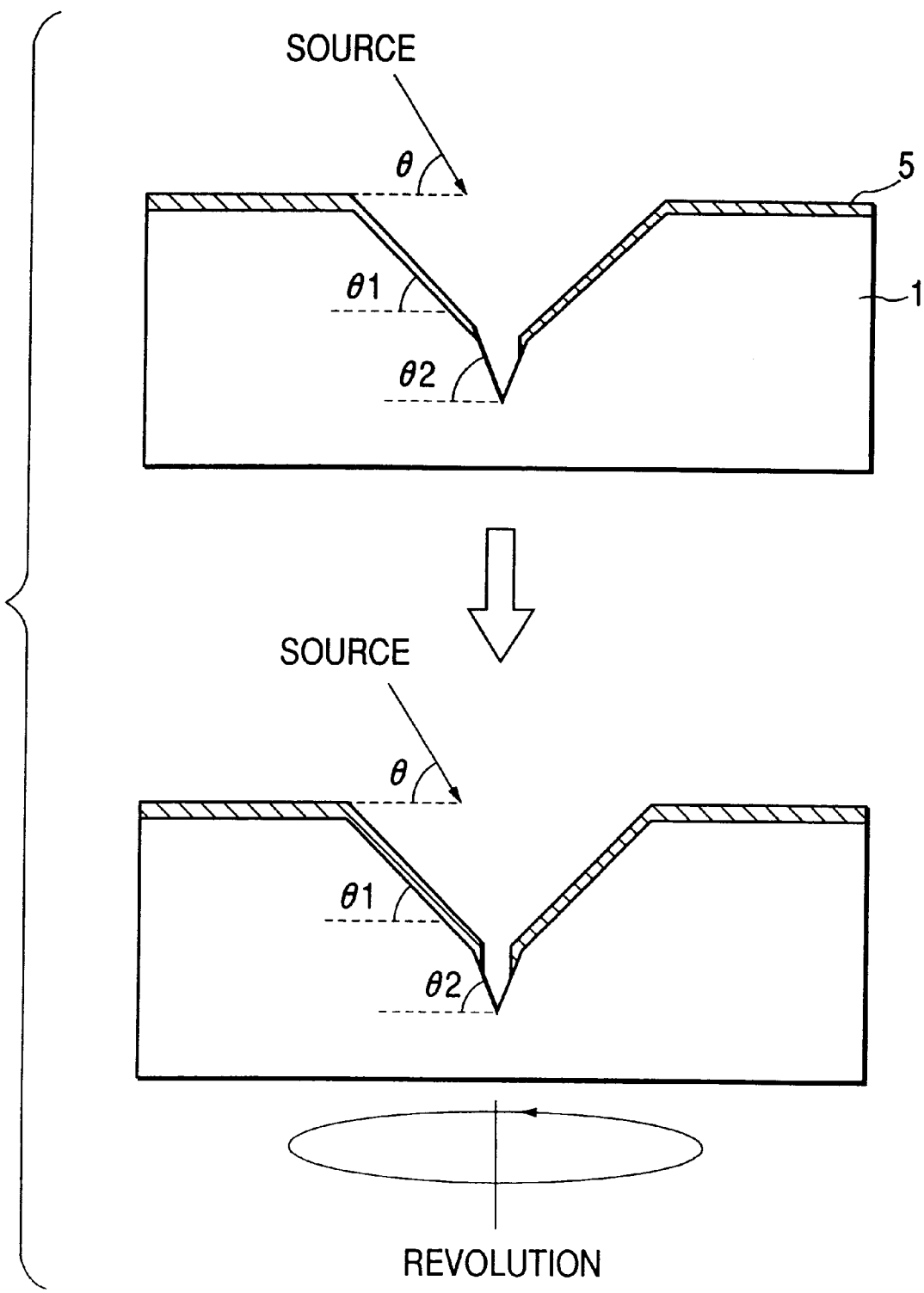
FIG. 9 is a schematic cross sectional view of a probe according to the invention, showing a step of preparing it.
Figure 10A:
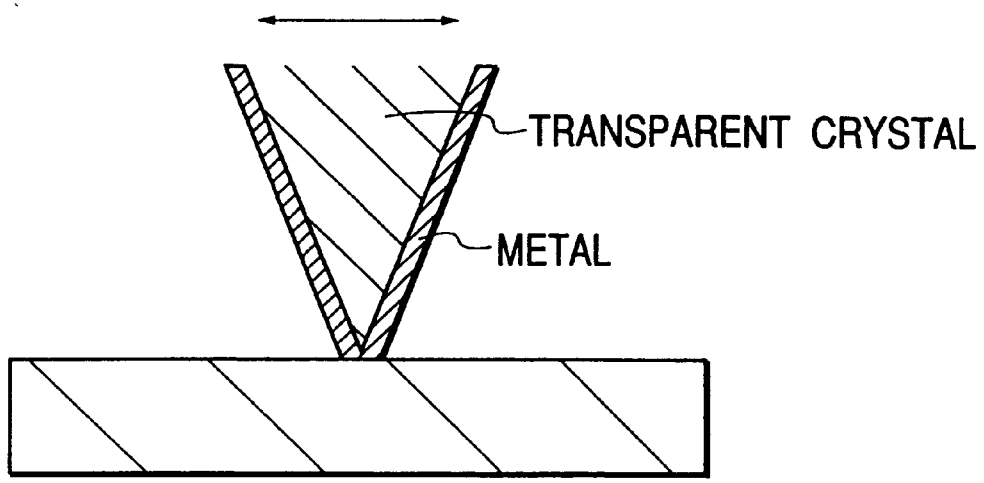
FIGS. 10A and 10B are schematic cross sectional views illustrating two different methods of forming a probe having a micro-aperture.
Figure 10B:
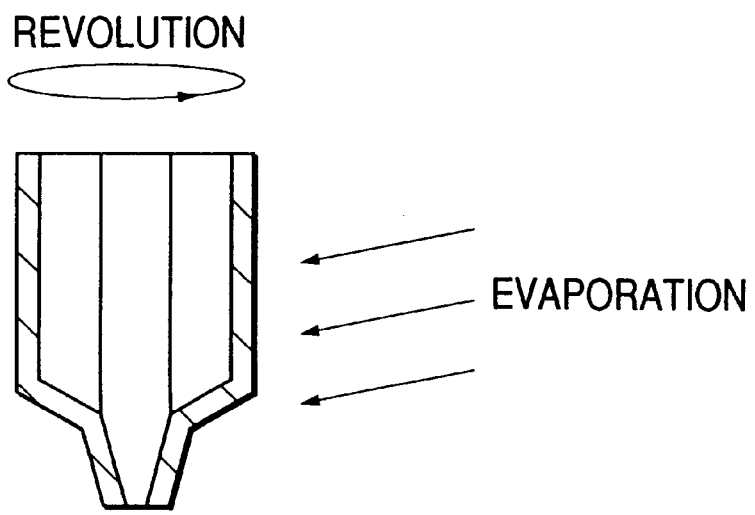

First, dents are formed on a first substrate in such a way that each of them have a pointed front end showing an angle (θ2) between the inner peripheral wall and the surface of the substrate which is larger than the angle (θ1) between the inner peripheral wall of the remaining area of the dent and the surface of the substrate (or θ2>θ1) (see FIG. 9). Such dents can be formed by a process as described below.

A protective layer 2 is formed on a first substrate 1 of single crystal silicon having a crystal plane of (100). Then, the protective layer 2 was removed at desired spots to partly expose the silicon by photolithography and etching. Thereafter, the exposed silicon was etched to produce dents 3 by crystal-axis-anisotropic etching or the like. The protective layer 2 may typically be made of silicon dioxide or silicon nitride. Crystal-axis-anisotropic etching is preferably used to etch the silicon because it can advantageously produce a pointed front end for each dent.

Figure 1A:
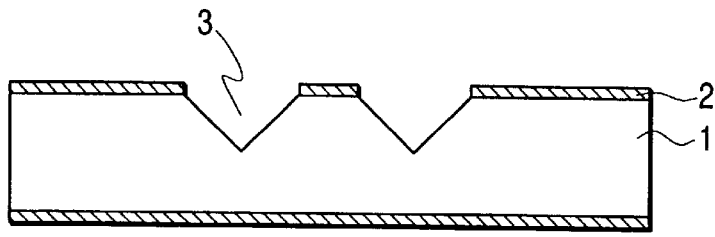
FIGS. 1A, 1B, 1C, 1D, 1E and 1F are schematic cross sectional views of a probe according to the invention and prepared in Example 1, showing different steps of forming a probe.

Dents 3 having a profile of inverted pyramid and defined by four surfaces equivalent to (111) plane can be produced by using an aqueous solution of potassium hydroxide as etching solution (see FIG. 1A).

The four inner walls of the dent and the surface of the first substrate shows an angle of about 55°. Then, a peeling layer 4 of silicon dioxide (SiO$_2$) is formed by thermally oxidizing the surface of the silicon of the first substrate 1 (see FIG. 1B). The front end of the dent 3 becomes pointed by the thermal oxidation because the front end of the dent 3 is supplied with oxygen at a rate lower than the rate of oxygen supply in areas close to the surface of the first substrate 1 and hence the silicon oxide layer shows a smaller thickness at the front end. The profile of the pointed front end can be controlled by controlling the overall thickness of the thermally oxidized silicon dioxide film. More specifically, a pointed front end can be produced for the dent when the silicon dioxide film has a thickness greater than 200 nm. The use of silicon dioxide for the peeling layer 4 makes it easy to peel off a light blocking layer 5, which will be described hereinafter. Alternatively, a dent having a pointed front end can be formed in a substrate by means of an FIB (focused ion beam). A pointed front end will be produced when the density of the FIB is raised at the front end in the process of forming a dent in the substrate.

Second, a light blocking layer 5 is formed on the surface of the first substrate 1 in a vacuum unit. While the light blocking layer 5 is preferably made of a metal such as Au, Pt, W, Ti, Cr, Pd, Ta, Ir, Re, Rh, Zr, Hf, Ag, Cu and Ni, it may alternatively be made of a semiconductor or a dielectric substance. The use of Au or Pt is advantageous in the subsequent peeling step that will be described hereinafter because it is poorly reactive at the surface. A micro-aperture region 6 that does not carry any light blocking layer can be formed in the front end area of the dent when the source of the material of the light blocking layer is arranged obliquely above the surface of the substrate so that the area is shadowed by the inner walls of the dent.

This will be described by referring to FIG. 9. If the angle between the inner walls of the dent and the surface of the substrate changes from θ1 to θ2, the source of the material of the light blocking layer is arranged at a position that makes evaporated particles of the material strike the substrate at an angle of θ (θ1<θ<θ2) and then the substrate is made to revolve horizontally. Then, there will be produced a micro-aperture in the vicinity of which no evaporated particles deposit. The source of the material of the light blocking layer is comparable to the evaporation source in a vacuum evaporation process and also to the target in a sputtering process. A layer of a light transmitting material may be formed in the space of the dent surrounded by the light blocking layer.

Figure 1B:
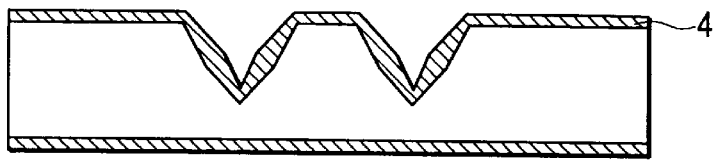
Figure 1C:
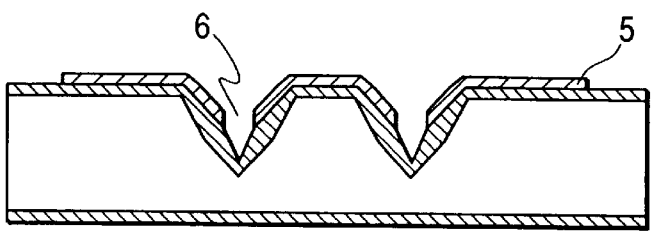

Third, the light blocking layer 5 (and the light transmitting layer if present) is subjected to a patterning operation to make it show a desired contour by photolithography and etching (see FIG. 1C).

Figure 1D:
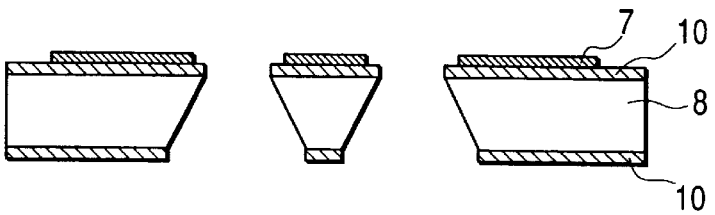

Fourth, if necessary, a bonding layer 7 is formed on a second substrate, or a target of transfer, onto which the light blocking layer 5 (and the light transmitting layer if present) is transferred so that the latter may easily adhere to the second substrate for transfer (see FIG. 1D).

Thus, for example, an optical fiber provided with a probe having a micro-aperture will be obtained if an optical fiber is used as target of transfer.

Also, an AFM/SNOM composite probe will be obtained if an elastic object such as a cantilever is used as target of transfer.

Fifth, the light blocking layer 5 (and the light transmitting layer if present) on the peeling layer 4 is bonded to the second substrate 8 or the bonding layer 7, if any, on the second substrate 8.

Figure 1E:
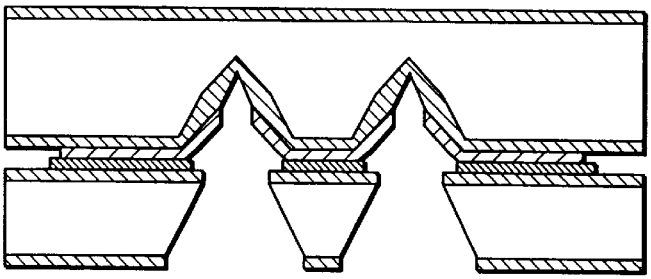

An alignment device adapted to hold the substrates by means of vacuum chucks may suitably be used so that the first substrate 1 and the second substrate 8 may be arranged accurately vis-a-vis and the light blocking layer 5 (and the light transmitting layer if present) on the first substrate 1 may be bonded to the second substrate 8 or the bonding layer 7, if any, on the second substrate 8 under pressure (see FIG. 1E).

Sixth, the first and second substrates are peeled off from each other along the interface of the peeling layer 4 and the light blocking layer 5 to transfer the light blocking layer 5 onto the second substrate 8 or the bonding layer 7, if any, on the second substrate 8.

Figure 1F:
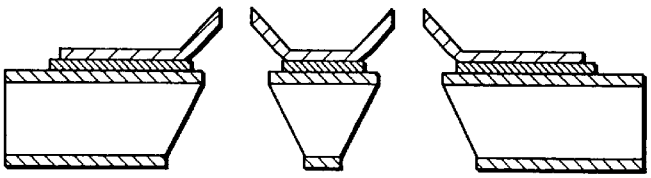

Thus, as the first substrate 1 and the second substrate 8 are pulled away relative to each other, they are separated from each other along the interface of the peelable layer 4 and the light blocking layer 5 (see FIG. 1F).

The above described method of forming a projection having a micro-aperture according to the invention provides the advantage of producing a micro-aperture with an enhanced degree of reproducibility if compared with known techniques because the size of the micro-aperture can be defined in two stages by the conditions of thermally oxidizing the silicon substrate and the angle of striking the surface of the substrate with particles in the evaporation step.

The above described method is particularly adapted to produce a plurality of micro-apertures on a substrate because the variance in the diameter of the micro-apertures formed by the method according to the invention is very small.

The present invention provides not only a method of forming a micro-aperture and a projection having such a micro-aperture but also a probe or a multi-probe having a projection or projections as well as a surface scanner, an aligner or an information processor comprising such a probe or a multi-probe. The surface of a specimen can be observed by arranging a probe according to the invention close to the specimen, two-dimensionally and intra-planarly scanning the surface of the specimen by means of an x-y actuator and detecting evanescent light seeping out from the surface of the specimen.

It is possible to prepare an aligner that can produce a micro-pattern that is dimensionally more minute than the wavelength of light by exposing resist to light by means of a probe according to the invention.

It is also possible to prepare an information recording/reproducing apparatus adapted to change the surface state of a micro-region of a recording medium and observing it by means of a probe according to the invention. SNOM signals can be used for controlling the distance and the contact force between the specimen and the recording medium. STM techniques and techniques using shearing force may also be applied to the present invention without limiting the scope of the present invention.

It is also possible to provide a surface scanner, an aligner or an information recording/reproducing apparatus having a large data transfer rate by using a multi-probe according to the invention in order to process data in parallel. A recording medium adapted to change its optical characteristics when a voltage is applied thereto may typically be made of 10, 12-pentacosadiynoic acid that gives rise to a structural change in the diacetylene derivative polymer to shift the peak wavelength of the light absorption band due to the Joule's heat produced by the local electric current generated as a result of the voltage application as described in Japanese Patent Application Laid-Open No. 4-90152.

A recording medium adapted to change its optical characteristics when a voltage is applied thereto while irradiating it with light, on the other hand, may typically be made of an azo compound having a quinone radical or a hydroquinone radical that gives rise to a cis-trans photo-isomerizing reaction to form a redox pair only when irradiated with light so that protons migrate between the redox pair if an electric field is applied thereto as described in Japanese Patent Application Laid-Open No. 2-98849.

Now, the present invention will be described in greater detail by way of examples.

EXAMPLE 1

Figure 2:
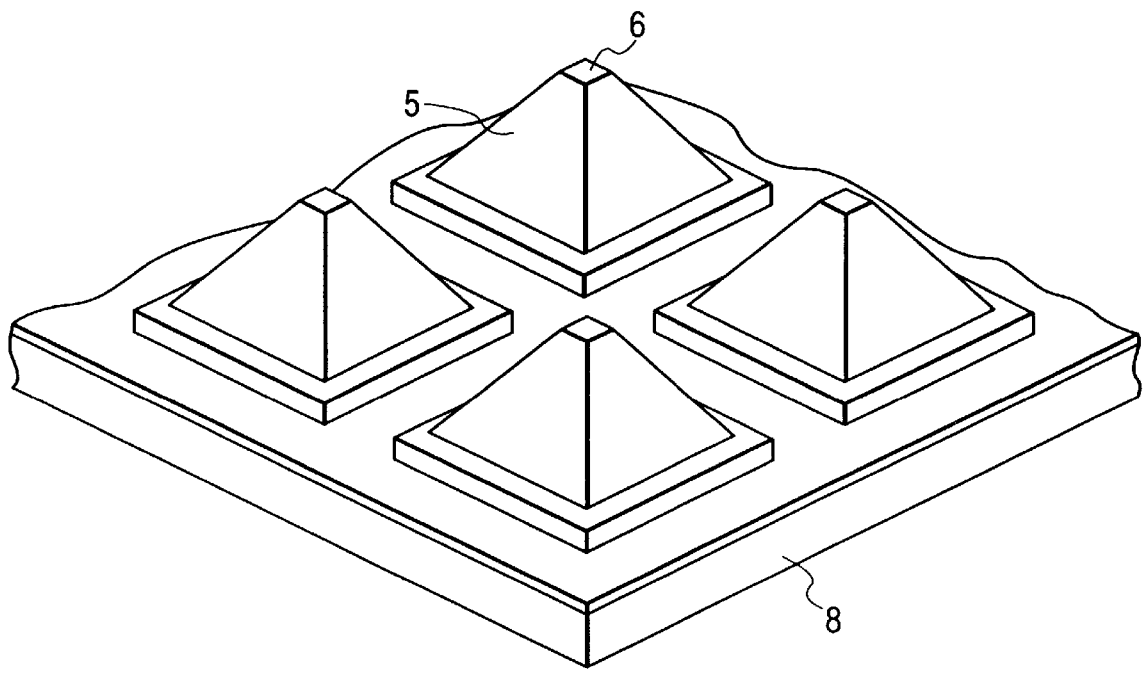
FIG. 2 is a schematic perspective view of the probe of Example 1.
Figure 3:
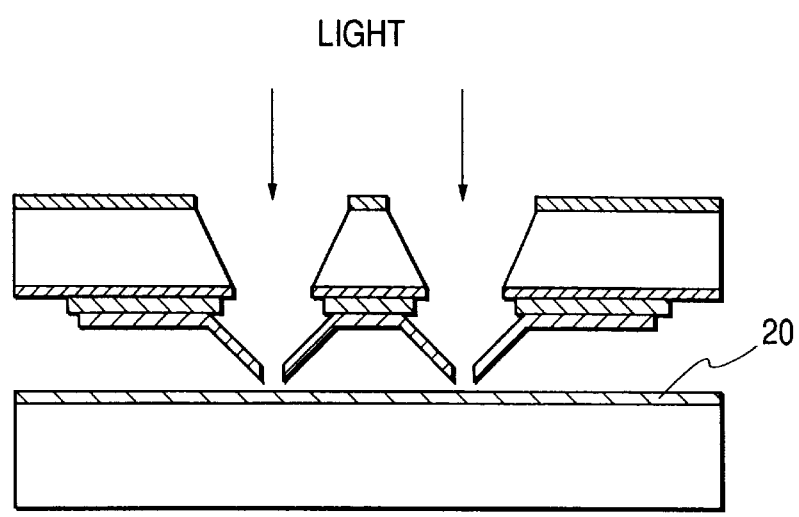
FIG. 3 is a schematic cross sectional view of the probe of Example 1, showing how it is used.

Example 1 relates to a multi-probe comprising an array of projections, each having a micro-aperture, arranged in the form of a matrix on a silicon substrate for micro-irradiation of light (see FIG. 2) and a method of forming such a multi-probe. A multi-probe as prepared in Example 1 may typically be used, as shown in FIG. 3, to expose a sheet of photoresist 20 to light to produce a micro-pattern by irradiating light from the side opposite to the side where the micro-apertures are arranged, while holding the photoresist so close to the micro-apertures as to make it exposed to evanescent light coming from the micro-apertures.

FIGS. 1A through 1F are schematic cross sectional views of a multi-probe for micro-irradiation of light according to the invention and prepared in Example 1, showing different steps of forming the multi-probe as will be described hereinafter.

A thermally oxidized silicon oxide film was formed to a thickness of 100 nm as protective layer 2 on a first substrate 1 of single crystal silicon wafer having a crystal plane of (100). Then, the protective layer 2 was patterned to expose the silicon by 10 $\mu$m square by photolithography and etching using an aqueous solution of hydrogen fluoride and ammonium fluoride. Thereafter, the exposed silicon was etched by crystal-axis-anisotropic etching using 30% aqueous solution of potassium hydroxide at 90° C. As a result of the above step, dents 3 having a profile of inverted pyramid and defined by four surfaces equivalent to (111) plane were produced to show a depth of about 7 $\mu$m (see FIG. 1A). The angle $\theta 1$ between each of the four inner walls of the dent 3 and the surface of the substrate 1 was determined by the crystal azimuth and equal to about 55°.

Subsequently, the protective layer 2 was removed by means of an aqueous solution of hydrogen fluoride and ammonium fluoride and then a peeling layer 4 of silicon dioxide was formed to a thickness of 400 nm by thermal oxidation at 1000° C. using a mixture gas of hydrogen and oxygen (see FIG. 1B). As a result, the dents 3 showed a pointed front end area, where the angle $\theta 2$ between the inner walls and the surface of the substrate 1 was equal to about 75°.

Then, a gold (Au) layer was formed as light blocking layer 5 on the surface of the first substrate 1 to a thickness of 100 nm by vacuum evaporation. During the operation of Au evaporation, the line connecting the first substrate 1 and the evaporation source of Au and the surface of the first substrate was held to an angle of 65° and the first substrate 1 was made to revolve intra-planarly so that an area carrying no Au deposit (micro-aperture 6) was produced at the front end of the dent 3. Thereafter, the light blocking layer 5 was subjected to a patterning operation by means of photolithography and etching (see FIG. 1C).

Then, silicon nitride was deposited on the surface of a second substrate 8 of single crystal silicon wafer having a crystal plane of (100) to a thickness of 100 nm by low pressure chemical vapor phase growth to produce a mask layer 10. Thereafter, the rear surface mask layer 10 was etched at desired spots to produce a pattern and partly expose the silicon by photolithography and dry etching using carbon tetrafluoride. Subsequently, Cr and Au were deposited by vacuum evaporation to respective thicknesses of 10 nm and 100 nm to produce a bonding layer 7. Then, the exposed silicon was etched to the surface mask layer 10 by crystal-axis-anisotropic etching using 30% aqueous solution of potassium hydroxide at 110° C. Thereafter, the surface mask layer was etched out from the rear side until it is totally removed (see FIG. 1D).

Then, the first substrate 1 and the second substrate 8 were bonded to each other along the interface of the light blocking layer 5 of the first substrate 1 and the bonding layer 7 of the second substrate 8 by applying pressure thereto (see FIG. 1E). Subsequently, the first substrate 1 and the second substrate 8 were separated from each other by peeling them off from each other along the interface of the light blocking layer 5 and the peeling layer 4 in order to transfer the light blocking layer 5 onto the second substrate 8 (see FIG. 1F).

When the plurality of micro-projections formed by the above process were observed through an electronic microscope, it was found that each micro-aperture showed an oblong contour having a short edge of 20 nm±5 nm. The above described process provides the advantage of producing projections, each having a very fine micro-aperture, with an enhanced degree of reproducibility if compared with known techniques. When the multi-probe prepared in this example was used as aligner in order to expose photoresist to light, an exquisitely fine pattern was produced with an enhanced exposure rate due to near-field exposure.

EXAMPLE 2

Example 2 relates to an optical multi-probe comprising an array of projections, each having a micro-aperture, arranged in the form of a matrix on a silicon substrate for detection of micro-irradiation of light and a method of forming such a multi-probe. Each of the optical probes of the multi-probe is combined with a light receiving device that is typically a photodiode.

Figure 5:
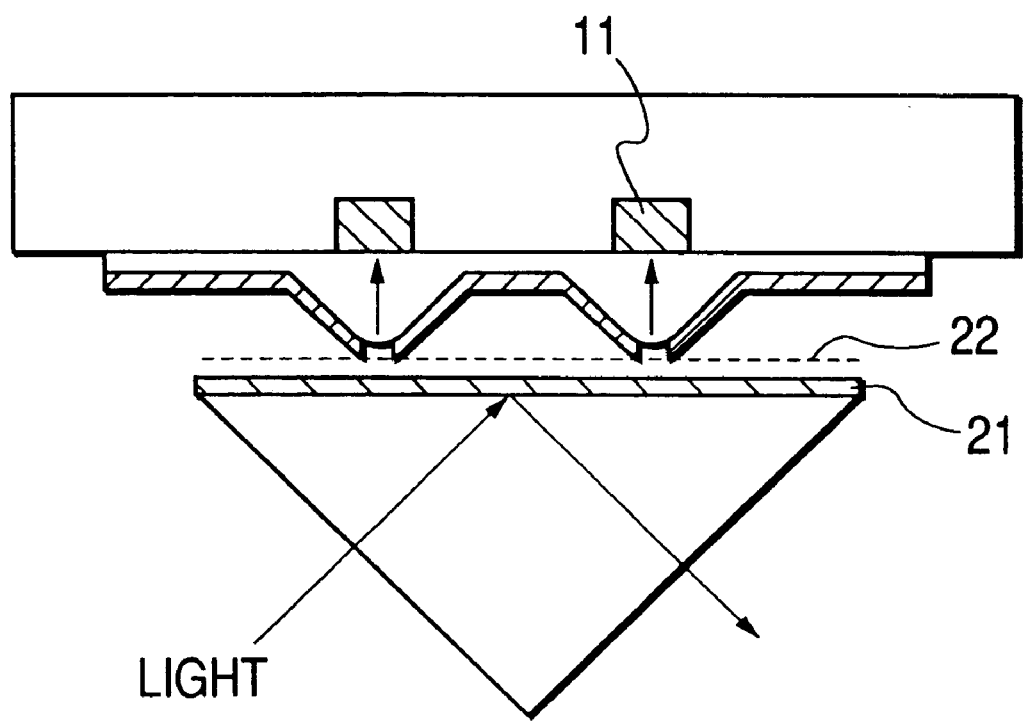
FIG. 5 is a schematic cross sectional view of the probe of Example 2, showing how it is used.

Referring to FIG. 5, a multi-probe as prepared in Example 2 may typically be used for a scanning near-field optical microscope (SNOM) for observing evanescent light 22 generated on the surface of the specimen 21 when light entering a prism is totally reflected by the contact surface of the specimen 21. The rate of observing specimen can be improved remarkably when a multi-probe is used for intra-planar scanning in place of a single probe.

While each probe having a micro-aperture is combined with a light receiving device in the example, the multi-probe may be combined with light emitting devices such as laser diodes to produce a multi-light-emitting device unit.

FIGS. 4A through 4F are schematic cross sectional views of a multi-probe for detecting micro-irradiation of light according to the invention and prepared in Example 2, showing different steps of forming the multi-probe as will be described hereinafter.

Figure 4A:
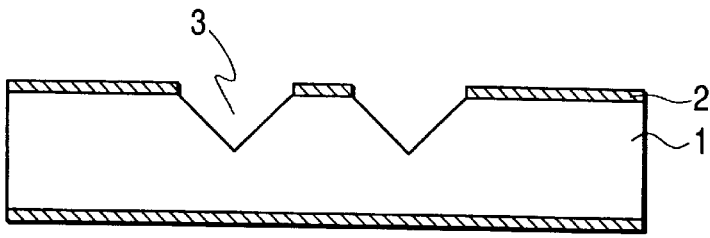
FIGS. 4A, 4B, 4C, 4D, 4E and 4F are schematic cross sectional views of a probe according to the invention and prepared in Example 2, showing different steps of forming a probe.
Figure 4B:
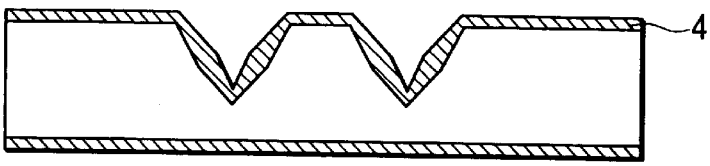
Figure 4C:
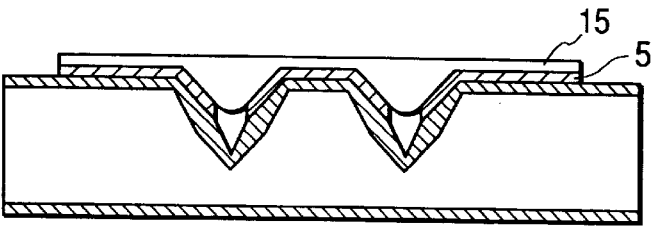

As in Example 1, a plurality of dents 3 were formed on the surface of a first substrate 1, the four inner walls of each dent showing angle θ1 of about 55° and angle θ2 of about 75° in a front end area with the surface of the first substrate 1 (see FIGS. 4A and 4B).

Then, platinum (Pt) was deposited on the first substrate 1 by sputtering to a thickness of 100 nm to form a light blocking layer 5. During the operation of sputtering Pt, the line connecting the first substrate 1 and the Pt target and the surface of the first substrate was held to an angle of 65° and the first substrate 1 was made to revolve intra-planarly so that an area carrying no Pt deposit (micro-aperture) was produced at the front end of each dent 3. Thereafter, polyimide 15 was applied to the first substrate including the dents 3 and then the light blocking layer 5 and the polyimide 15 were subjected to a patterning operation, using photolithography and etching (see FIG. 4C).

Figure 4D:
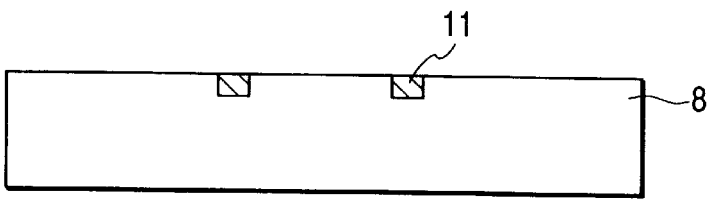
Figure 4E:
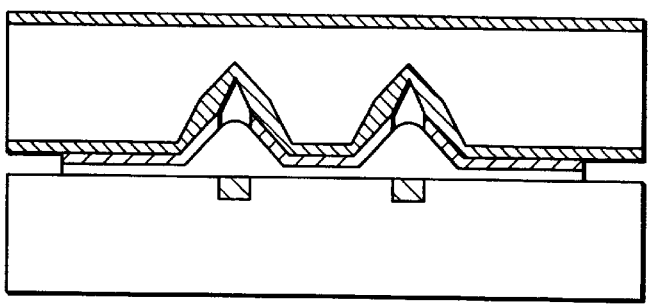
Figure 4F:
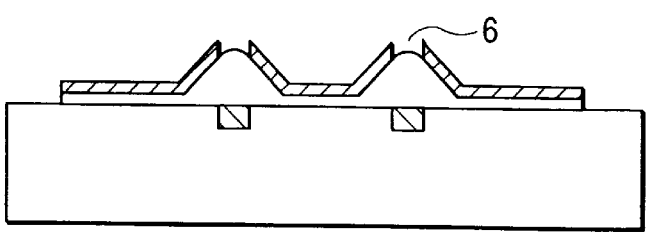

A second substrate 8 carrying light receiving devices 11 of diodes was prepared (see FIG. 4D). Then, the first substrate 1 and the second substrate 8 were bonded together by heating them at 200° C. (see FIG. 4E). Thereafter, the first substrate 1 and the second substrate 8 were separated from each other by peeling them off along the interface of the peeling layer 4 and the light blocking layer 5 in order to transfer the micro-projections of the light blocking layer 5 and the polyimide 15 onto the second substrate, each micro-projection having a micro-aperture (see FIG. 4F).

When the plurality of micro-projections formed by the above process were observed through an electronic microscope, it was found that each micro-aperture showed an oblong contour having a short edge of 20 nm±5 nm. The above described process provides the advantage of producing projections, each having a very fine micro-aperture, with an enhanced degree of reproducibility if compared with known techniques. When the multi-probe prepared in this example was used for a surface scanner, a SNOM image was obtained with an enhanced degree of resolution and a high rate of observation.

EXAMPLE 3

Example 3 relates to a probe comprising a projection having a micro-aperture and fitted to the front end of an optical fiber for micro-irradiation of light or detection of such light and also to a method of forming such a probe. FIGS. 6A through 6E are schematic cross sectional views of a probe according to the invention and prepared in Example 3, showing different steps of forming a probe, which will be described hereinafter.

Figure 6A:
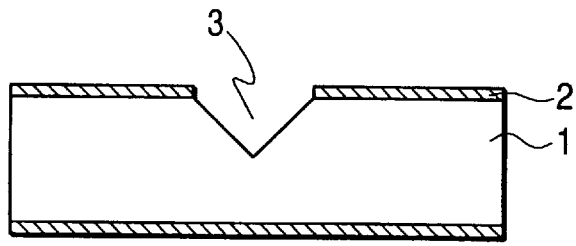
FIGS. 6A, 6B, 6C, 6D and 6E are schematic cross sectional views of a probe according to the invention and prepared in Example 3, showing different steps of forming a probe.
Figure 6B:
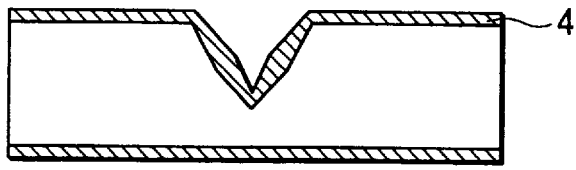
Figure 6C:
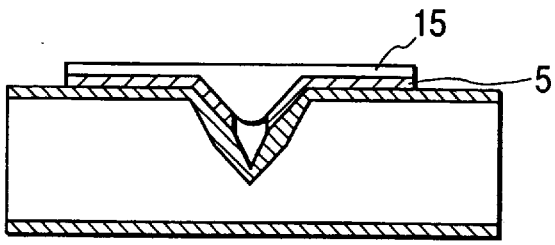

As in Example 2, a dent 3 was formed on the surface of a first substrate 1 to produce a projection of a light blocking layer 5 and polyimide 15 having a micro-aperture at the front end thereof (see FIGS. 6A, 6B and 6C).

Figure 6D:
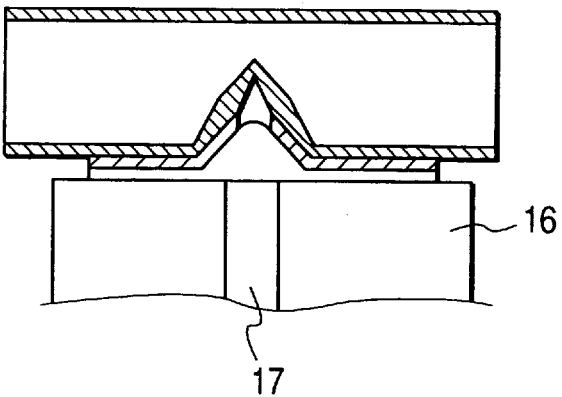

Then, the obtained structure was placed on the front end of an optical fiber, aligning the core 17 of the optical fiber 16 with the micro-aperture as shown in FIG. 6D, and bonded to the optical fiber at 200° C.

Figure 6E:
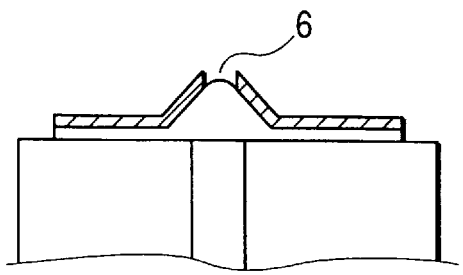

Thereafter, the first substrate 1 and the optical fiber 16 were separated from each other by peeling them off along the interface of the peeling layer 4 and the light blocking layer 5 to transfer the micro-projection of the light blocking layer 5 and the polyimide 15 onto the front end of the optical fiber 16 (see FIG. 6E). When optical probe formed by the above process were observed through an electronic microscope, it was found that the micro-aperture showed an oblong contour having a short edge of 20 nm±5nm. The above described process provides the advantage of producing a projection having a very fine micro-aperture with an enhanced degree of reproducibility if compared with known techniques. When the probe prepared in this example was used for a surface scanner, a SNOM image was obtained with an enhanced degree of resolution.

EXAMPLE 4

Example 4 relates to a probe comprising a projection having a micro-aperture and fitted to a cantilever for micro-irradiation of light and detection of such light together with micro-force and also to a method of forming such a probe. FIGS. 7A through 7D are schematic cross sectional views of a probe according to the invention and prepared in Example 4, showing different steps of forming a probe, which will be described hereinafter.

Figure 7A:
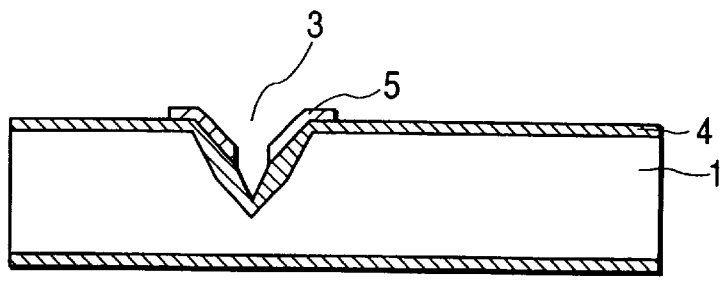
FIGS. 7A, 7B, 7C and 7D are schematic cross sectional views of a probe according to the invention and prepared in Example 4, showing different steps of forming a probe.
Figure 7B:
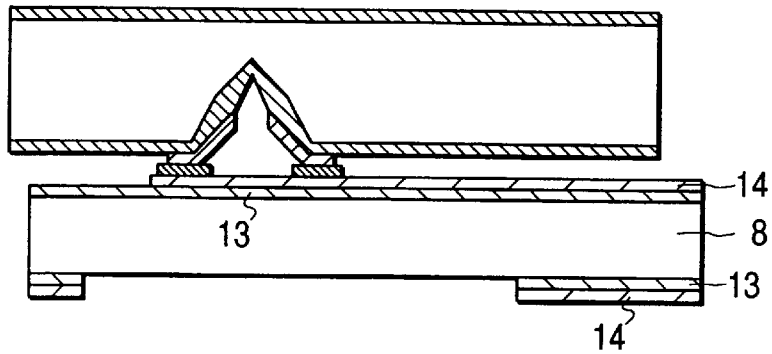
Figure 7C:
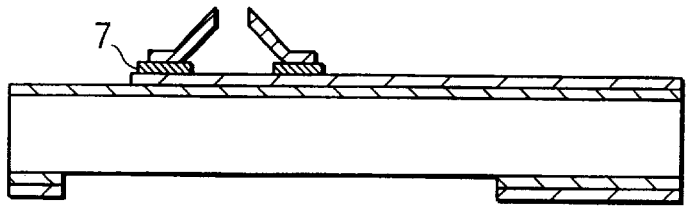
Figure 7D:
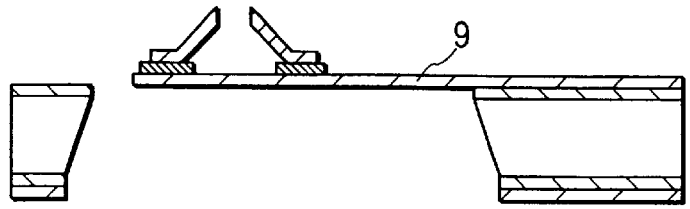

As in Example 2, a dent 3 was formed in a peeling layer 4 on the surface of a first substrate 1 to produce a projection of a light blocking layer 5 having a micro-aperture at the front end thereof (see FIG. 7A).

Then, a silicon dioxide layer 13 and a silicon nitride layer 14 were formed to respective thicknesses of 0.3 µm and 0.5 µm on each of the surfaces of a second substrate 8 made of single crystal silicon. Then, the silicon nitride layer 14 was partly removed by means of a patterning operation using photolithography and etching to make it show a profile of a cantilever 9, which was 50 µm wide and 300 µm long. Then, the silicon nitride layer 14 and the silicon dioxide layer 13 were partly removed to produce an etching mask also by means of a patterning operation. Then, a titanium (Ti) film and a gold (Au) film were formed to respective thicknesses of 3 nm and 50 nm and subjected to a patterning operation using photolithography and etching to produce a bonding layer 7 on the cantilever.

Thereafter, the light blocking layer 5 on the first substrate 1 and the bonding layer 7 on the second substrate 8 were aligned and held in contact with each other. The two layers were bonded together by applying pressure thereto (see FIG. 7B). Then, the first substrate 1 and the second substrate 8 were separated from each other to peel them off along the interface of the peeling layer 4 and the light blocking layer 5 (see FIG. 7C).

After applying polyimide by spin coating to form a surface protection layer, it was subjected to a heat treatment operation at 200° C. Thereafter, the second silicon substrate 8 was etched from the rear side, using the silicon nitride layer 14 on the back side as etching mask and also using 30% aqueous solution of potassium hydroxide at 90° C. Then, the silicon dioxide layer 13 was removed by means of an aqueous solution of a mixture of hydrogen fluoride and ammonium fluoride. Finally, the surface protection layer was removed by means of oxygen plasma to produce a cantilever-type probe.

Figure 8:
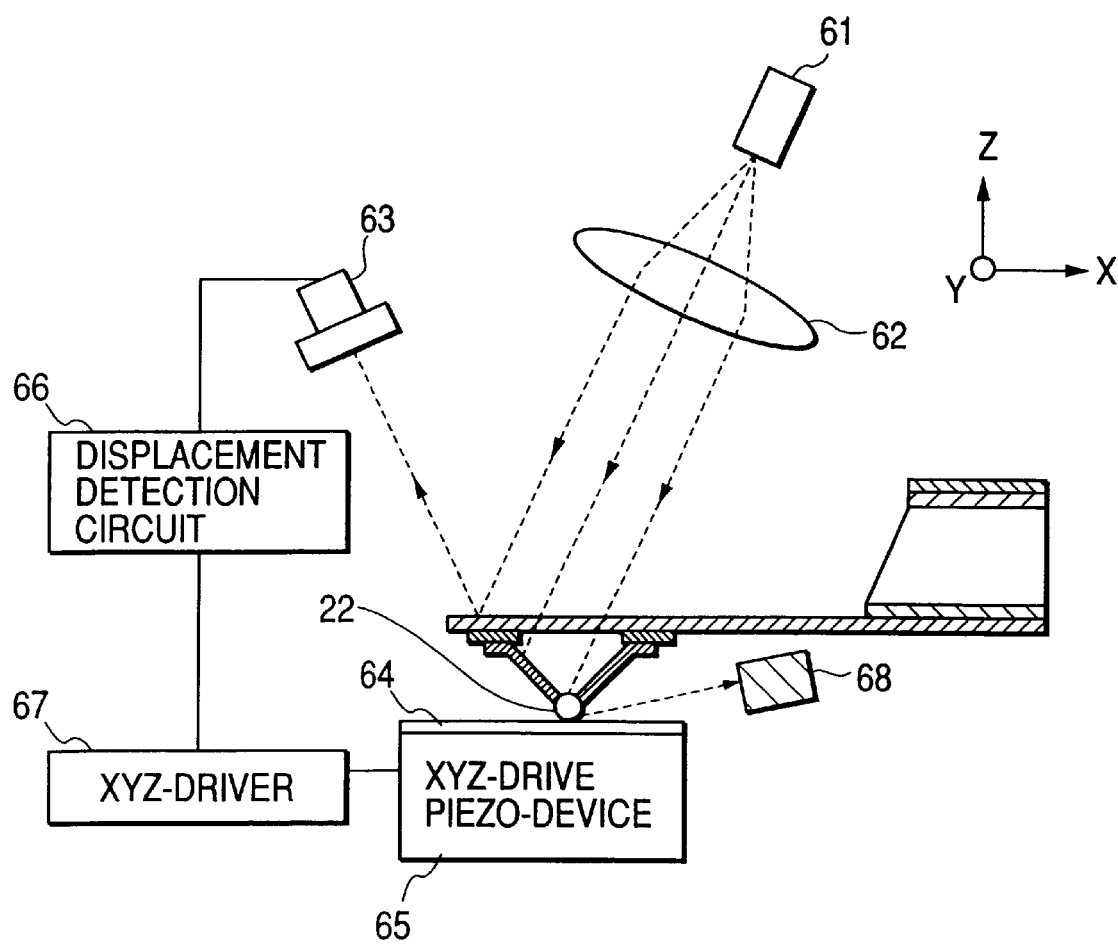
FIG. 8 is a schematic block diagram of an AFM/SNOM composite unit using a probe as prepared in Example 4.

FIG. 8 is a schematic block diagram of an AFM/SNOM composite unit using a probe as prepared in Example 4.

This unit comprises a probe formed of a cantilever 9, a bonding layer 7 and a light blocking layer 5 bonded to the bonding layer 7, a laser source 61 for irradiating the back side of the free end of the cantilever, a position sensor 63 for detecting the change in the angle of reflection of light due to the deflection of the cantilever, a displacement detection circuit 66 for detecting the displacement of the cantilever from the signal from the position sensor, an XYZ-axes drive piezoelectric device 65, an XYZ-axes driver 67 for driving the XYZ-axes drive piezoelectric device 65 in the X-, Y- and Z-directions and a detector 68 for detecting micro-irradiation of transmitted light that has been produced as evanescent light seeping out of the micro-aperture and scattered by the surface of specimen 64. In this example, both optical information on the surface of the specimen and information on the profile of the specimen could be obtained by arranging an SNOM probe on a cantilever. While a hard probe may easily be damaged when it contacts with a specimen, the probe of this example was free from damages as it was fitted to a cantilever. Since a probe as prepared in this example can be held in contact with the surface of a specimen to obtain optical information, an SNOM using such a probe does not require any positional feedback and control system for the Z-direction (normal to the surface of the specimen).

What is claimed is:

1. A method of forming a projection having a micro-aperture comprising steps of:

etching a substrate to form a recess which narrows to a point;

depositing a light blocking material on the substrate except the front end of the dent; and peeling off the light blocking material from the substrate.

2. A method according to claim 1, wherein said step of forming a recess includes a substep of:

etching the substrate; and thermally oxidizing the surface of the substrate.

3. A method according to claim 2, wherein said substrate is made of silicon.

4. A method according to claim 2, wherein said step of depositing a light blocking material includes a sub-step of:

arranging a source or a target of the light blocking material obliquely above the substrate and conducting an operation of sputtering or vacuum evaporation.

5. A method according to claim 1, wherein said peeling-off step includes sub-steps of:

forming a bonding layer on a second substrate different from the substrate having the recess referred to as first substrate; and bonding part of the light blocking material to the bonding layer and peeling off the light blocking material from the first substrate.

6. A method according to claim 3, wherein silicon dioxide is formed on the surface of the substrate including the surface of the recess to a film thickness of 200 nm or greater by the thermal oxidation.

7. A method according to claim 6, wherein the peeling off operation is conducted between the light blocking material and the silicon dioxide.

\* \* \* \* \*

UNITED STATES PATENT AND TRADEMARK OFFICE
CERTIFICATE OF CORRECTION

PATENT NO.    : 6,156,215
DATED         : December 5, 2000
INVENTOR(S)   : Yasuhiro Shimada et al.

It is certified that error appears in the above-identified patent and that said Letters Patent is hereby corrected as shown below:

Title page, Item [54] and Column 1, lines 1-6,
Title, "METHOD OF FORMING A PROJECTION HAVING A MICRO-APERTURE, PROJECTION FORMED THEREBY, PROBE HAVING SUCH A PROJECTION AND INFORMATION PROCESSOR COMPRISING SUCH A PROBE" should read -- METHOD OF FORMING A PROJECTION HAVING A MICRO-APERTURE --.

Item [57], ABSTRACT,
Line 1, "formiNg" should read -- forming --;
Lines 2 and 9, "dent" should read -- recess --; and
Line 4, "dent," should read -- recess, --.

Column 1,
Line 28, "if" should read -- whether --;
Line 29, "paid" should read -- made --;
Line 46, "(1986)]." should read -- (1986)). --;
Line 48, "and" should be deleted; and
Line 58, "in an SNOM" should be deleted.

Column 2,
Line 8, "a" should be deleted; and "productivity" should read -- productivity, --;
Line 9, "realize a process" should be deleted;
Line 20, "reproducibility, the method minimizing" should read -- reproducibility. The method minimizes --;
Line 22, "achieving" should read -- achieves --;
Line 32, "forming a dent having a pointed front end on a substrate;" should read -- etching a substrate to form a recess which narrows to a point --; and
Line 34, "dent" should read -- recess --.

UNITED STATES PATENT AND TRADEMARK OFFICE
CERTIFICATE OF CORRECTION

PATENT NO.     : 6,156,215
DATED          : December 5, 2000
INVENTOR(S)    : Yasuhiro Shimada et al.

It is certified that error appears in the above-identified patent and that said Letters Patent is hereby corrected as shown below:

Column 3,
Line 15, "Now, a" should read -- A --;
Lines 18 and 29, "dents" should read -- recesses --;
Line 19, "have a pointed front end" should read -- narrow to a point --;
Line 34, "produces a pointed front end for each dent." should read
-- for each recess, produces a recess which narrows to a point. --;
Line 35, "Dents" should read -- Recesses --;
Lines 39, 43 and 55, "dent" should read -- recess --;
Line 40, "shows" should read -- show --;
Lines 48, 51 and 57, "pointed front end" should read -- point --;
Line 51, "dent" should read -- recess --;
Line 55, "dent having a pointed front end" should read -- recess which narrows to a point --.

Column 4,
Line 3, "end area" should be deleted and "dent" should read -- recess --;
Line 6, "dent." should read -- recess. --;
Lines 8 and 19, "dent" should read -- recess --; and
Line 43, "vis-a-vis" should be deleted.

Column 5,
Line 5, "micro-aperture" should read -- micro-aperture, --;
Line 6, "projections" should read -- projections, --; and
Line 65, "invention and" should read -- invention, --.

Column 6,
Lines 10, 13 and 33, "dent" should read -- recess --;
Line 10, "of" should read -- of an --;
Line 21, "dents" should read -- recesses --;
Line 25, "as" should read -- as a --; and
Line 50, "is" should read -- was --.

Column 7,
Line 2, "as" should read -- as an --;
Line 19, "specimen" should read -- a specimen --;
Line 29, "multi-probe" should read -- multi-probe, --;
Lines 31 and 44, "dents" should read -- recesses --; and
Lines 32 and 43, "dent" should read -- recess --.

UNITED STATES PATENT AND TRADEMARK OFFICE
CERTIFICATE OF CORRECTION

PATENT NO.    : 6,156,215
DATED         : December 5, 2000
INVENTOR(S)   : Yasuhiro Shimada et al.

It is certified that error appears in the above-identified patent and that said Letters Patent is hereby corrected as shown below:

<u>Column 8,</u>
Lines 13 and 47, "dent" should read -- recess --; and
Line 27, "probe" should read -- probes --.

<u>Column 9,</u>
Line 37, "with" should be deleted;
Line 38, "damages" should read -- damage --; and
Line 41, "an" should read -- a --.

<u>Column 10,</u>
Line 14, "of:" should read -- of --;
Line 15, "etching the substrate; and" should be deleted; and
Line 16, "¶ thermally" should read -- thermally --.

Signed and Sealed this

Sixth Day of May, 2003

JAMES E. ROGAN
*Director of the United States Patent and Trademark Office*